(12) United States Patent
Reinhardt

(10) Patent No.: US 6,605,210 B2
(45) Date of Patent: Aug. 12, 2003

(54) HYDRAULIC FLUID FILTER DEVICE

(75) Inventor: Hans Reinhardt, Bretten (DE)

(73) Assignee: FSP-Holding AG, Baar (CH)

( * ) Notice: Subject to any disclaimer, the term of this patent is extended or adjusted under 35 U.S.C. 154(b) by 0 days.

(21) Appl. No.: 10/150,758

(22) Filed: May 17, 2002

(65) Prior Publication Data

US 2002/0170852 A1 Nov. 21, 2002

Related U.S. Application Data

(63) Continuation of application No. PCT/EP00/07654, filed on Aug. 8, 2000.

(30) Foreign Application Priority Data

Nov. 20, 1999 (DE) .......................................... 109 55 635

(51) Int. Cl.[7] .................... B01D 29/54; B01D 35/147; B01D 27/10; B01D 27/14
(52) U.S. Cl. .................... 210/130; 210/132; 210/167; 210/232; 210/333.01; 210/323.2; 210/340; 210/416.4; 126/196 A
(58) Field of Search ..................... 210/130, 132, 210/167, 168, 172, 232, 333.01, 340, 346, 416.4, 416.5, 430, 253, 323.2, 323.1, 261, 450; 123/196 A; 184/6.24

(56) References Cited

U.S. PATENT DOCUMENTS 5,772,868 A 6/1998 Reinhardt

FOREIGN PATENT DOCUMENTS

| DE | 3700999 A1 | * | 7/1988 |
|---|---|---|---|
| DE | 40 11 913 | | 10/1991 |
| DE | 4221897 A1 | * | 1/1994 |
| DE | 195 11 482 | | 10/1996 |
| DE | 195 14 224 | | 10/1996 |
| DE | 197 52 376 | | 5/1999 |
| EP | 1199093 A1 | * | 4/2002 |

OTHER PUBLICATIONS

Mager, M., "Filtration in hydraulischen Systemen", pp. 18–22, 24, 26, 28, 30, 32–33, *Konstr. Jahrbuch* 1998, ISSN 0341–2660.

"Kombinationsfilterelemente für verbesserte Filtration von Hydraulikflüssigkeiten", *Ölhydraulik und Pneumatik*, Germany, vol. 37, No. 8, pp. 652–653, ISSN: 0341–2660;1993.

"Hydraulic filtration", *Hydraulics and Pneumatics*, USA, Cleveland 1978, vol. 31, No. 3, pp. 10–21, ISSN: 0018–814X.

* cited by examiner

*Primary Examiner*—Joseph Drodge
*Assistant Examiner*—Terry K. Cecil
(74) *Attorney, Agent, or Firm*—Barry R. Lipsitz; Douglas M. McAllister

(57) ABSTRACT

A filter device for filtering hydraulic fluid includes first and second subelements 40, 42 within a filter housing having separate inflows 20, 24 thereto for the respective subelements and a common outflow 22. The first subelement has a higher filter fineness than the second subelement. Several bypass configurations are taught and include: (i) a bypass line 28 for bypassing the second subelement by drawing fluid directly from the supply 95; (ii) a bypass valve 116 (FIG. 3) for bypassing the first subelement; and (iii) a bypass valve 151 (FIG. 5) for connecting the first subelement inflow 20 with the common outflow 22. The device is compact, has an easy-to-service arrangement, and ensures protection of a hydraulic pump and highly stressed hydraulic components.

22 Claims, 4 Drawing Sheets

HYDRAULIC FLUID FILTER DEVICE

This application is a continuation of international application number PCT/EP00/07654 filed on Aug. 8, 2000.

The present disclosure relates to the subject matter disclosed in international application No. PCT/EP00/07654 of Aug. 8, 2000, which is incorporated herein by reference in its entirety and for all purposes.

The invention relates to a filter device for filtering a hydraulic fluid, with a filter housing in which a filter element is disposed.

The invention also relates to a filter element for a filter device of this type and to a hydraulic circuit with a filter device.

Filter devices of the type stated at the beginning have many uses, for example in self-propelled machinery, such as construction or agricultural machinery for example. In such cases, the hydraulic systems have to meet very high requirements concerning the cleanliness of the hydraulic fluid in order for them to operate as intended over long periods without any malfunctions and with little wear. With many hydraulic systems there is already a high risk of damage occurring to the hydraulic pumps being used when they are put into operation for the first time, on account of residues of dirt remaining in the hydraulic fluid tank. In particular in the case of complexly shaped tanks formed as a cast part or welded construction, reliable, thorough cleaning is scarcely possible with a reasonable amount of effort. Therefore, at least one protective filter which holds back dirt particles of a minimum size of about 60 $\mu$m is usually disposed upstream of the hydraulic pumps.

However, protective filters of this type are usually not adequate to ensure the required long-term wear resistance of the highly stressed hydraulic components. To do so, in many cases much smaller dirt particles have to be effectively filtered out from the hydraulic fluid. For this purpose, a separate fine filter, with a fineness of less than 15 $\mu$m, that is to say with which dirt particles of a minimum size of approximately 15 $\mu$m can be removed, may be used in addition to said protective filter. In this case, the protective filter is used in the form of a suction filter, which is disposed in the intake line of the hydraulic pump, and the fine filter is fitted in the return line or pressure line of the hydraulic system. In this case, screening elements are usually used as the suction filter, while filter elements with filter material of nonwoven fabric, which in many cases themselves still filter out dirt particles of a size of around 5 $\mu$m from the hydraulic fluid with an efficiency of at least 50%, can be used in the pressure or return filters. Although the use of two separate filters with different filter fineness makes it possible to achieve a long service life of the hydraulic system, it involves considerable costs both in terms of fitting out a system for the first time and in terms of servicing.

Alternatively, it may also be envisaged to use only a single filter with a fineness of at least about 20 $\mu$m, so that dirt particles of a size of at least 20 $\mu$m are still filtered out from the hydraulic fluid with an efficiency of 99% by means of the single filter used. This not only permits reliable protection of the hydraulic pumps, but also protects the further hydraulic components from contaminants. Since the filter is disposed upstream of the pump, however, and consequently has to be formed as a suction filter, a large overall volume is required for the filter, in order that, in spite of the filter fineness used, a relatively low permissible pressure loss on the suction side of the hydraulic pump is not exceeded. This disadvantage is particularly significant whenever a heavy-bodied oil has to be used as the hydraulic fluid or low temperatures, and consequently high viscosities for the hydraulic fluid, are to be expected when the hydraulic system is put into operation.

It is an object of the present invention to develop a filter device of the type stated at the beginning which ensures reliable protection both of a hydraulic pump and of other highly stressed hydraulic components and has a compact, easy-to-service form of construction.

This object is achieved according to the invention in the case of a filter device of the generic type by the filter element comprising a first and a second subelement, the first subelement having a higher filter fineness than the second subelement and both subelements being insertable through a common insertion opening into the filter housing, and by it being possible for hydraulic fluid to be fed to each subelement via a separate supply inflow in the filter housing and for filtered hydraulic fluid to be discharged from both subelements via a common outflow in the filter housing.

According to the invention, a combination filter element which can be inserted into the filter housing and has two subelements with different fineness is provided for the filter device. The filter housing has at least two access openings, so that different flows of hydraulic fluid can be fed to the two subelements. The filtered hydraulic fluid can then be discharged via a third opening in the filter housing. Such a configuration of the filter device makes it possible to dispose one of the two subelements of the filter element upstream of a hydraulic pump, while the other subelement can be disposed downstream of other hydraulic components. The subelement disposed upstream of the hydraulic pump may in this case have a coarser fineness than the other subelement, so that the pressure loss on the suction side of the hydraulic pump can be kept low, while at the same time even very small dirt particles can be filtered out of the hydraulic fluid by means of the other subelement, in that the subelement is disposed in the return line of the hydraulic system. To do so, separate access openings for the two subelements are provided on the filter housing.

Since the two subelements can be inserted into the filter housing via a common insertion opening, the filter device is also distinguished by being very easy to service, since it is not required to dismantle the filter device completely to allow the two subelements to be exchanged.

The two supply inflows are preferably separated fluid-tightly from each other by means of at least one sealing element. Such a configuration provides the possibility of inserting the two subelements into a common receiving space of the filter housing, into which the two supply inflows open, it then being ensured by at least one sealing element that the supply inflow for the first subelement is separated fluid-tightly from the supply inflow for the second subelement. O-ring seals may be used, for example, as the sealing elements. The sealing elements are preferably held on the subelements and can be inserted together with the filter elements into the filter housing.

In the case of a preferred embodiment, it is provided that at least the first subelement has an associated bypass line with a bypass valve. The first subelement is distinguished by a higher fineness, so that there is the risk, in particular for this subelement of it gradually becoming clogged during its use. This results in an increasing pressure loss. To avoid an impermissible pressure increase at the first subelement, the bypass valve is provided in the form of a pressure-relief valve, which releases the bypass line if a pressure increase beyond fixed normal values takes place on the flow-accepting side of the first subelement. This avoids damage to the first subelement.

It is of advantage if the bypass line connects the supply inflow of the first subelement to the supply inflow of the second subelement. Such a configuration has the advantage that, in the event of an impermissible pressure increase at the first subelement, the hydraulic fluid can continue to be filtered by means of the second subelement even though the first subelement is bypassed, so that, even when the first subelement is clogged, at least relatively coarse dirt particles continue to be filtered out of the hydraulic fluid by means of the second subelement.

Alternatively, it may be provided that the bypass line connects the supply inflow of the first subelement to the common outflow of the first and second subelements. In this case it is of advantage if a screening element is provided in the bypass line.

A detachably connectable cover is preferably provided for closing the insertion opening. In this case, it is particularly favorable if the filter housing has a filter casing for receiving the filter element, which can be closed fluid-tightly by means of the cover. A through-opening, which forms a supply inflow for one of the two subelements or the common outflow for both subelements, is preferably disposed in a bottom wall of the filter casing.

In the case of a particularly compact configuration of the filter device according to the invention, it is provided that the filter casing has two lateral through-openings. For example, it may be provided that the filter casing is cylindrically shaped, with two through-openings being formed on the lateral surface of the cylinder and forming, for example, a supply inflow for the first subelement and a common outflow. It may alternatively be provided that the two supply inflows for the subelements are disposed at different heights in the lateral surface of the cylinder, while the common outflow is disposed in the bottom wall of the cylinder.

The present invention is also based on the object of providing a filter element for use in the filter device stated above.

This object is achieved according to the invention by the filter element comprising a first and a second subelement, the first subelement having a higher filter fineness than the second subelement. The filter element according to the invention can consequently be used in the form of a combination filter element simultaneously for the protection of a hydraulic pump and for the protection of highly stressed hydraulic components. The advantages which can be achieved in this way have already being presented in connection with the discussion of the filter device according to the invention.

It is favorable if the first subelement has a fineness of less than approximately 20 $\mu$m, in particular a fineness of less than about 15 $\mu$m, so that even dirt particles of a size of 15 $\mu$m can still be filtered out of the hydraulic fluid with an efficiency of at least 99%.

The first subelement preferably comprises a filter material with a nonwoven fabric, since this allows a higher fineness to be ensured in a simple way. For example, it may be provided that even dirt particles of a size of about 5 $\mu$m are still filtered out with an efficiency of at least 50% by means of the nonwoven fabric.

To ensure reliable protection of a hydraulic pump, it is favorable if the second subelement has a fineness of less than 60 $\mu$m. To do so, the second subelement may be formed, for example, as a screening element.

In the case of a particularly preferred configuration of the filter element according to the invention, it is provided that the two subelements can be detachably connected to each other. This provides the possibility of inserting the two subelements in the connected state into the filter housing, or removing them from it, in a simple way. The two subelements can be detached from each other, so that they can be exchanged independently of each other.

A configuration which can be produced at particularly low cost is distinguished by the fact that the two subelements can be non-detachably connected to each other. For example, it can be provided that the two subelements are adhesively bonded or welded to each other.

The filter element is preferably shaped in a substantially cylindrical manner, the two subelements being disposed axially one behind the other. This provides the possibility of inserting the combination filter element into a cylindrical filter casing of a filter housing in a simple way.

It is of advantage if the filter element comprises a sealing ring, preferably running around in the peripheral direction, for the fluid-tight separation of the supply inflows of the two subelements. For example, it may be provided that the two subelements are formed in a hollow-cylindrical manner and can in each case be flowed through from the outside inward, and that the sealing element is axially disposed approximately at the height of the connection between the two subelements. This makes it possible to position the combination filter element in a cylindrical filter casing which is provided on its lateral surface with two through-openings, which are respectively associated with a subelement and are in fluid connection with an annular space surrounding the filter element, the annular space being axially subdivided into two fluid-tightly separate portions by means of the sealing element, so that different flows of fluid can be fed to the subelements via the two portions.

It may alternatively be provided that the two subelements are formed in a hollow-cylindrical manner and can be flowed through radially from the inside outward, a partition being positioned between the two subelements, and the two subelements respectively accepting flow on the end face at their free ends. This provides the possibility of disposing a sealing ring respectively at the free ends of the two subelements, so that the annular space surrounding the subelements can be separated fluid-tightly from the free ends of the subelements. The filtered hydraulic fluid can be fed via the annular space to a common outflow, while the free ends of the subelements have separate associated supply inflows.

To achieve a particularly compact configuration, it is provided in the case of a preferred embodiment that the filter element comprises a bypass valve for bypassing the first subelement. For example, it may be provided that the filter element is formed in a hollow-cylindrical manner, the two subelements being axially disposed one behind other and respectively forming a portion of the lateral surface of the filter element, and that the bypass valve is disposed on an end face of the filter element. It may alternatively be provided that the bypass valve is mounted on a partition between the two subelements.

In the case of a particularly preferred embodiment, it is provided that the second subelement can be flowed through in two directions. This provides the possibility of changing the direction of throughflow through the second subelement, so that a more effective back-washing effect is achieved, prolonging the lifetime of the filter considerably. The second subelement may, for example, be shaped in a hollow-cylindrical manner, the filter material used forming the lateral surface of the cylinder and being supported both on its outer side and on its inner side in each case by a supporting tube having through-openings.

The present invention is also based on the object of providing a hydraulic circuit which provides the possibility of ensuring reliable protection of at least one hydraulic pump and highly stressed hydraulic components by means of the filter device explained at the beginning.

To achieve this object, the invention proposes a hydraulic circuit with a supply of hydraulic fluid which is made available to at least one hydraulic consumer by means of a pump, and can be fed back from the consumer to the hydraulic supply via at least one return line, and also with a filter device of the type stated at the beginning, one supply inflow of the filter device being connected to the hydraulic supply, the other supply inflow being connected via a return line to at least one consumer and the outflow of the filter device being connected to the pump. With this hydraulic circuit, the pump can be reliably protected. To do so, the supply inflow associated with the second, coarser subelement of the filter device is connected to the hydraulic supply, and the hydraulic pump is connected to the common outflow of the filter device. The hydraulic fluid which is fed to the pump from the hydraulic supply is consequently filtered via the second subelement. This involves only a relatively small pressure drop at the second subelement, on account of its relatively low fineness, so that the hydraulic pump is loaded only a little. To filter even very small dirt particles effectively out of the hydraulic fluid, the first subelement is disposed in a return line leaving the hydraulic consumer. To do so, the return line is connected to the supply inflow of the filter device associated with the second subelement, so that the hydraulic fluid flowing out from the consumer flows via the first subelement to the common outflow of the filter device and is effectively filtered as it does so. Consequently, coarsely filtered hydraulic fluid from the hydraulic supply and finely filtered hydraulic fluid from the consumer can be fed simultaneously to the hydraulic pump via the filter device. The finer, first subelement is flowed through exclusively by the hydraulic fluid which originates from the system return and is fed to the hydraulic pump. The coarser, second subelement, on the other hand, is flowed through only by the amount constituting the difference between the pump delivery flow and the return flow.

It is favorable if the first subelement has an associated bypass valve or pressure-relief valve, by which the pressure drop at the first subelement can be limited.

It may be provided that only a partial flow of the hydraulic fluid delivered by the at least one pump is passed to the supply inflow of the filter device associated with the first subelement, while the remaining hydraulic fluid is fed to the hydraulic supply. For example, it may be provided that at least two hydraulic pumps are used, downstream of which there is respectively disposed a hydraulic consumer, for example a hydraulic steering system and working hydraulics, only the working hydraulics being connected to the supply inflow of the first subelement, while the hydraulic steering is connected to the hydraulic supply.

It may alternatively be provided that all the hydraulic fluid delivered by the at least one pump is fed to the supply inflow of the filter device associated with the first subelement.

The following description of preferred embodiments of the invention serves for a more detailed explanation in conjunction with the drawing, in which.

Figure 1:
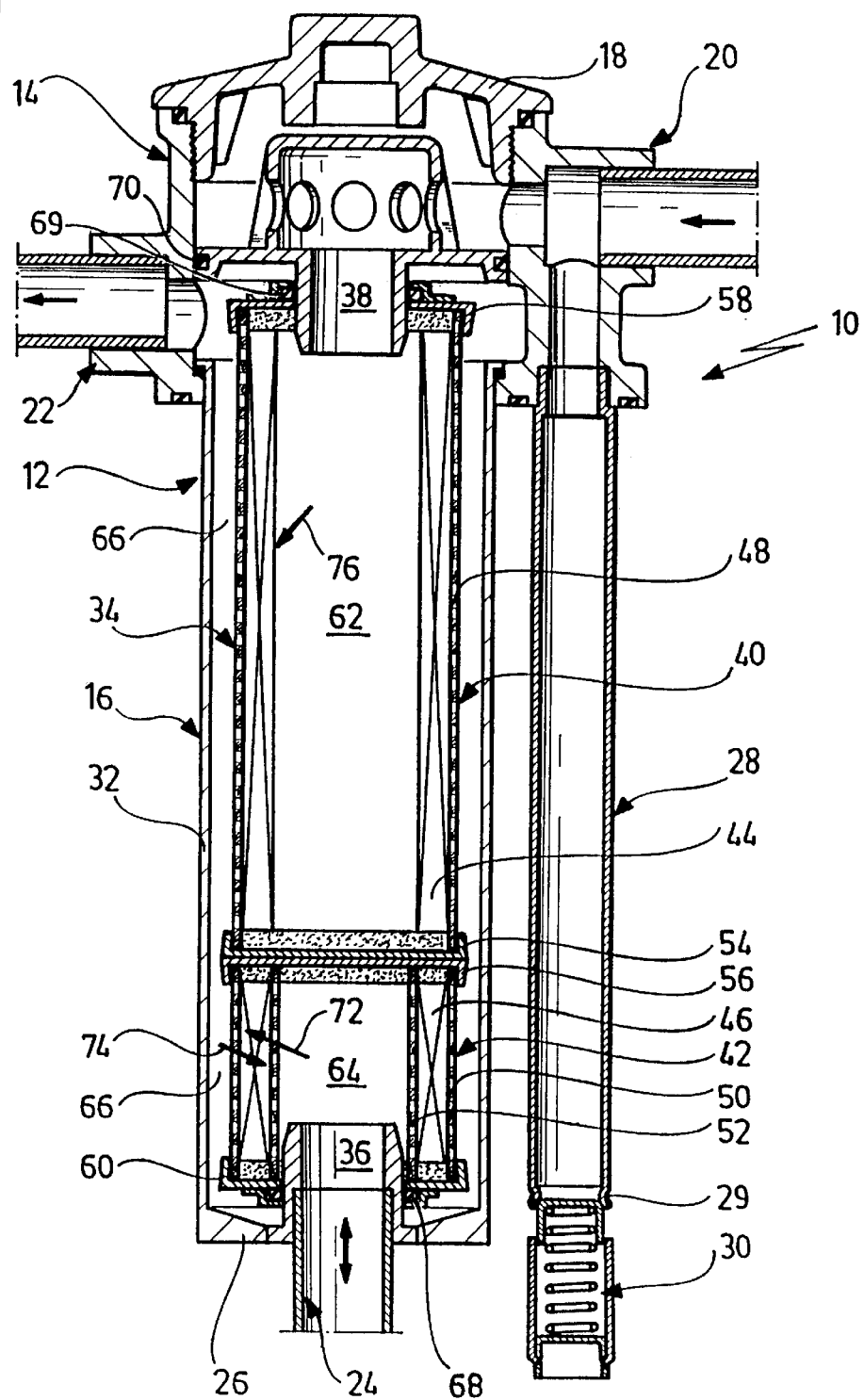
FIG. 1 shows a sectional view of a first embodiment of a filter device according to the invention.

In FIG. 1, a first embodiment of a filter device, denoted overall by the reference numeral 10, is schematically represented in a sectional view. This device comprises a filter housing 12 with a substantially cylindrical filter head 14, with which a likewise cylindrically formed filter casing 16 is connected in the axial direction and which can be closed fluid-tightly on the upper end face, remote from the filter casing 16, by means of a cover 18. The filter head 14 has in its side wall a first supply inflow 20 for feeding in hydraulic fluid to be filtered and an outflow 22 for discharging filtered hydraulic fluid. A second supply inflow 24 is provided in a bottom wall 26 of the filter casing 16. Branching off from the first supply inflow 20 is a bypass line 28, which is aligned parallel to the longitudinal axis of the filter casing 16 and at the free end 29 of which a bypass valve 30 is disposed in the form of a spring-loaded nonreturn valve 30.

Arranged within the filter casing 16 and with a spacing from its side wall 32 is a combination filter element 34, which extends from a supply-inflow connection piece 36, protruding from the inside of the bottom wall 26 of the filter casing 16, up to the height of an inflow connection piece 38, positioned within the filter head 14. The supply-inflow connection piece 36 is in this case in flow connection with the second supply inflow 24, while the inflow connection piece 38 is in flow connection with the first supply inflow 20.

The combination filter element 34 has a cylindrical configuration and comprises a first subelement 40, with which the inflow connection piece 38 is connected, and a second subelement 42, with which the first subelement 40 is directly connected in the axial direction and which is in flow connection with the supply-inflow connection piece 36. The two subelements 40 and 42 in each case have a filter material 44 and 46, respectively, which forms a cylinder jacket, and is supported on its outer side by a supporting tube 48 and 50, respectively, having through-openings. For the second subelement 42, a further supporting tube 52, having through-openings, is additionally provided on the inner side of the filter material 46. At the end faces, the two subelements 40 and 42 in each case have an end cap 54 and 56, respectively, at the mutually facing ends, and on the free end faces there is in each case disposed a terminating plate 58 and 60, respectively, with a through-opening which is passed through by the inflow connection piece 38 and the supply-inflow connection piece 36, respectively. The inner space 62 of the first subelement 40, surrounded by the filter material 44, is consequently in flow connection with the first supply inflow 20 via the inflow connection piece 38, while the inner space 64 of the second subelement 42, surrounded by the filter material 46, is in flow connection with the second supply inflow 24 via the supply-inflow connection piece 36. The supporting tube 48 of the first subelement and the outer supporting tube 50 of the second subelement are disposed with a spacing with respect to the side wall of the filter casing 16, thereby forming a common annular space 66, the annular space 66 being separated fluid-tightly from the first supply inflow 20 and the second supply inflow 24 by means of an O-ring 68, disposed on the terminating plate 60 of the second subelement 42, an O-ring 69, disposed on the terminating plate 58 of the first subelement 40, and an O-ring 70, surrounding the inflow connection piece 38. The annular space 66 is in flow connection with the outflow 22. This has the consequence that both the hydraulic fluid fed via the first supply inflow 20 to the first subelement and the hydraulic fluid fed via the second supply inflow 24 to the second subelement 42 can be discharged via the annular space 66 and the outflow 22.

Since the second subelement 42 has both on its outer side and on its inner side in each case a supporting tube 50 and 52, respectively, it can be flowed through radially in both directions, that is both from the inside outward, as indicated by the arrow 72, and from the outside inward, as symbolized by the arrow 74. By contrast with this, the first subelement 40 can only be flowed through from the inside outward, corresponding to the arrow 76.

A nonwoven fabric with a high fineness may be used, for example, as the filter material 44 for the first subelement 40, so that even dirt particles of a size of about 5 μm can still be filtered out with an efficiency of at least 50%.

By contrast with the first subelement 40, the second subelement 42 is of a coarser configuration; it may, for example, be formed as a screening element with a fineness of at least approximately 60 μm.

Figure 2:
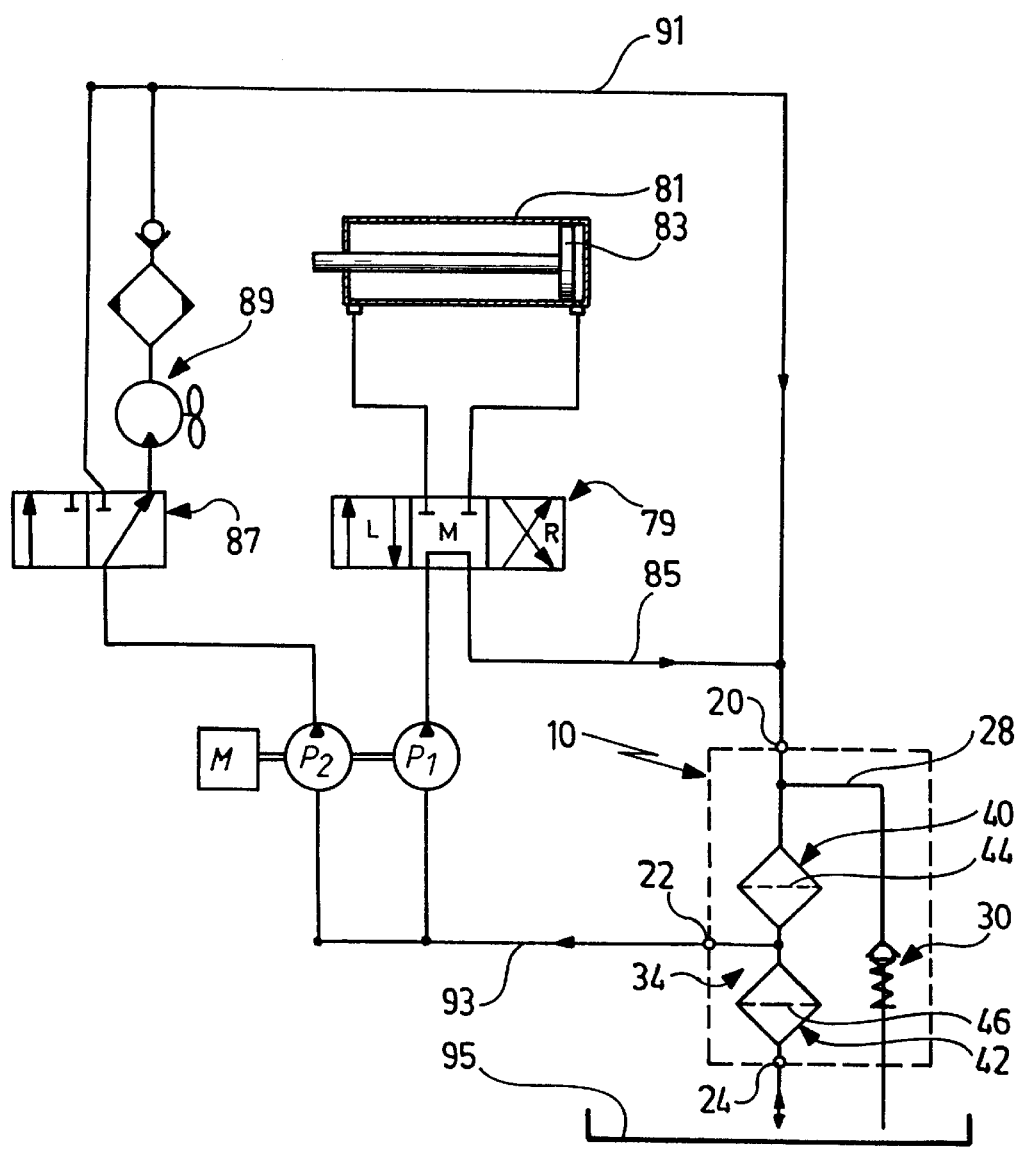
FIG. 2 shows a block diagram of a hydraulic circuit with a filter device according to the first embodiment.

An example of a hydraulic circuit in which the filter device 10 can be used is represented in FIG. 2. In this case, two hydraulic pumps P1 and P2, driven by a motor M, are connected to the common outflow 22. The pump P1 is in flow connection via a three-way valve 79 with a double-acting hydraulic cylinder 81, in which a piston 83 is displaceably mounted. From the hydraulic cylinder 81, a line leads back to the three-way valve 79 and from the latter via a return line 85 to the first supply inflow 20 of the filter device 10.

Disposed downstream of the hydraulic pump P2 is a two-way valve 87, via which hydraulic fluid can be fed to a consumer 89. From the latter, a return line 91 likewise leads to the first supply inflow 20 of the filter device 10.

The second supply inflow 24 of the filter device 10 is in flow connection via a feed line 93 with a hydraulic supply 95. The latter is also connected via the bypass line 28 and the bypass valve 30 to the first supply inflow 20.

In the case of the hydraulic circuit sketched in FIG. 2, all the hydraulic fluid delivered by the two pumps P1 and P2 is fed via the first supply inflow 20 to the first subelement 40 and filtered by the latter. Depending on the intensity of the pump delivery flow fed to the pumps P1 and P2 and of the return flow returned from the hydraulic system via the return line 85 and the return line 91, either hydraulic fluid is sucked in from the supply 95 via the second subelement 42 or else excess hydraulic fluid is discharged via the second subelement 46 to the hydraulic supply 95. For this purpose, the second subelement 46 can be flowed through in both directions, a change in the direction of throughflow having the consequence of an effective back-flushing effect, by which the lifetime of the filter can be prolonged significantly.

If the combination filter element 40 is to be exchanged, all that is required to do so is to detach the cover 18 of the filter device 10, in order subsequently to remove the inflow connection piece 38 and the combination filter element 34 from the filter housing 12. Access to the filter housing 12 in the region of the filter casing 16 is consequently not required to exchange the combination filter element 34. The filter device 10 is therefore particularly easy to service.

Figure 3:
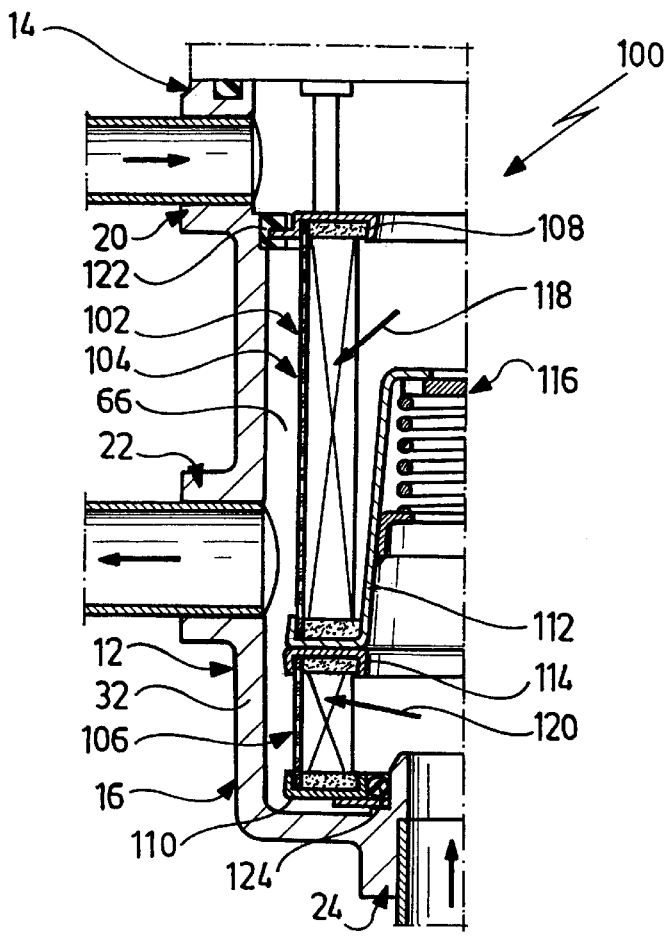
FIG. 3 shows a partial sectional view of a second embodiment of a filter device according to the invention.
Figure 5:
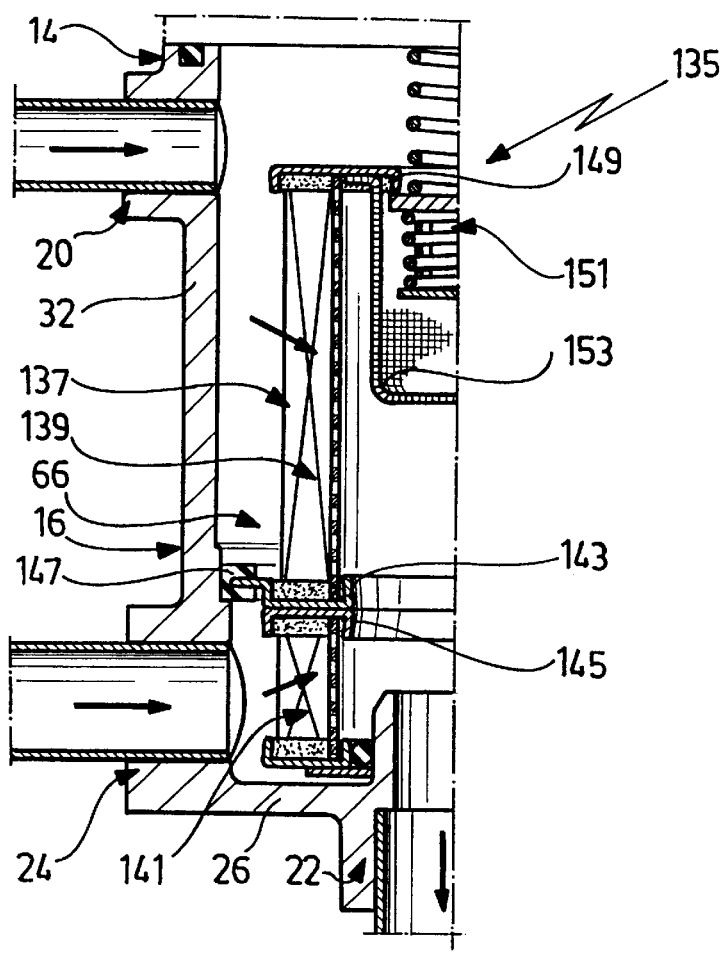
FIG. 5 shows a partial sectional view of a third embodiment of a filter device according to the invention and FIG. 6 shows a block diagram of a hydraulic circuit with a filter device according to the third embodiment.

Alternative configurations of the filter device according to the invention are represented in FIGS. 3 and 5. These are constructed in a similar way to the filter device 10 explained above with reference to FIG. 1. Therefore, the same reference numerals as in FIG. 1 have been used for identical or functionally equivalent components. In the case of the filter device 100 represented in FIG. 3, a substantially cylindrically formed filter housing 12 with a filter head 14 and a filter casing 16 is likewise used, the first supply inflow 20 being arranged on the filter head 14 and the second supply inflow 24 being arranged on the bottom wall of the filter casing 16. The common outflow 22 is arranged in the region of the side wall 32 of the filter casing 16.

A combination filter element 102 with a first subelement 104 and a second subelement 106 is positioned within the filter casing 16, the first subelement 102 having a higher fineness than the second subelement 106. Both subelements 104 and 106 are formed in a hollow-cylindrical manner and have in each case on the free end faces a terminating plate 108 and 110, respectively, with a central through-opening, and on the mutually facing free end faces there is disposed in each case an end cap 112 and 114, respectively. By contrast with the exemplary embodiment represented in FIG. 1, however, the two end caps 112, 114 do not form a fluid-tight partition between the inner spaces of the two subelements 104 and 106, but have in each case a through-opening, a bypass valve 116 being disposed on the end cap 112 of the first subelement 104. The bypass valve 116 is consequently held on the combination filter element 102 and can be removed together with the latter from the filter housing 12. A separate bypass valve, as used in the case of the filter device 10, can be omitted in the case of the filter device 100.

The flow onto the first filter element 104 takes place via the first supply inflow 20 and the terminating plate 108, the first subelement being flowed through from the inside outward, as symbolized in FIG. 3 by the arrow 118. The second subelement 106 is likewise flowed through from the inside outward, corresponding to the arrow 120. The inner spaces of the two subelements 104 and 106 are in flow connection via the bypass valve 116, so that in the event of an impermissible pressure increase at the first subelement 104, a flow connection between the flow-accepting side of the first subelement 104 and the flow-accepting side of the second subelement 106 is released. That is to say, even if the first subelement 104 is bypassed by means of the bypass valve 116, at least coarse filtering of the hydraulic fluid still takes place by means of the second subelement 106.

For the fluid-tight sealing of the annular space 66, which surrounds the combination filter element 102 and is in flow connection with the outflow 22, from the supply inflows 20 and 24, on the terminating plate 108 and 110 there is disposed in each case an annular seal 122 and 124, respectively.

Figure 4:
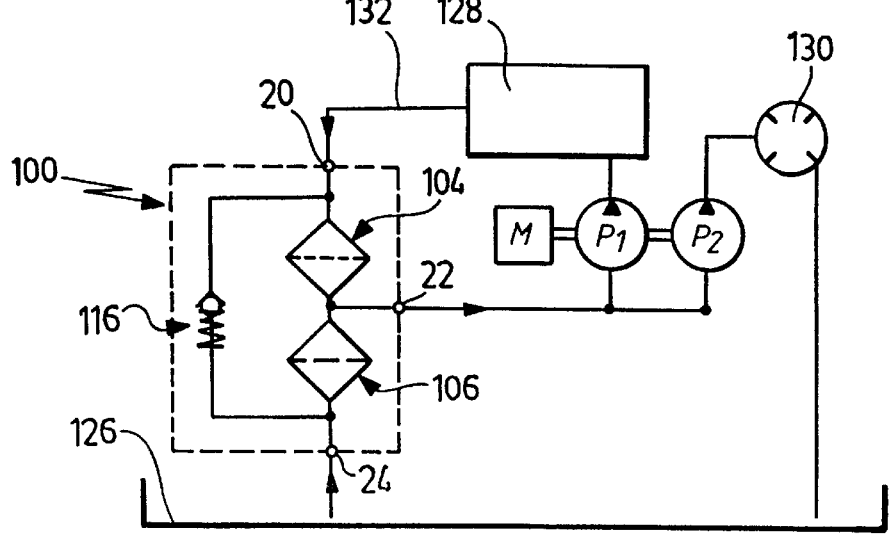
FIG. 4 shows a block diagram of a hydraulic circuit with a filter device according to the second embodiment.

An example of a hydraulic circuit according to the invention, in which the filter device 100 can be used, is represented in the manner of a block diagram in FIG. 4. In this case, hydraulic fluid is fed to the filter device 100 from a hydraulic supply 126 via the second supply inflow 24, associated with the second subelement 106, and two hydraulic pumps P1 and P2 are connected to the common outflow 22, downstream of which pumps there is disposed in each case a consumer 128 and 130, respectively. The latter may, for example, take the form of a hydraulic steering system.

By contrast with the circuit sketched in FIG. 2, in the case of the hydraulic circuit according to FIG. 4 it is provided that only the flow of hydraulic fluid originating from the consumer 128 is passed via a return line 132 to the first supply inflow 20 of the filter device 100, while the flow of hydraulic fluid delivered by the pump P2 is returned from the consumer 130 directly into the hydraulic supply 126.

If a pressure increase beyond fixed normal values takes place on the flow-accepting side of the first subelement 104, a flow connection to the supply inflow 24 of the second subelement 106 is released by the bypass valve 116, i.e. the hydraulic fluid originating from the consumer 128 is fed directly to the second subelement 106, without coming into contact with the hydraulic fluid located in the hydraulic supply 126.

A further alternative configuration of a filter device according to the invention is represented in FIG. 5. This is denoted overall by the reference 135. It is configured in a way similar to the filter device 100 explained with reference to FIG. 3. Used in this case, however, is a combination filter element 137, the first and second subelements 139 and 141 of which are respectively flowed through from the outside inward. The through-opening disposed on the bottom wall 26 of the filter casing 16 in this case forms the common outlet 22 of the filter device 135, while the first supply inflow 20 and the second supply inflow 24 are disposed on the filter head and on the side wall 32 of the filter casing 16, respectively.

To ensure that the hydraulic fluid fed in via the first supply inflow 20 is filtered exclusively by the finer subelement 139, a sealing ring 147 is held at the height of the mutually facing end caps 143 and 145, respectively, of the two subelements 139, 141 on the combination filter element 137, said sealing ring axially dividing the annular space 66 surrounding the combination filter element 137 into two regions, which are in each case in flow connection with one of the two supply inflows 20 and 24, respectively.

Disposed on the terminating plate 149 of the first subelement 139, having a central through-opening, is a bypass valve 151, downstream of which in the direction of throughflow a screening element 153 is disposed. If, in the event of an impermissible pressure increase, the first subelement 139 is bypassed, in that the bypass valve 151 goes over into its open position, a flow connection between the first supply inflow 20 and the common outflow 22 is released, although it is then ensured by means of the screening element 153 that the hydraulic fluid fed to the first supply inflow 20 is freed of coarse dirt particles by means of the screening element 153 even when the first subelement is bypassed.

Figure 6:
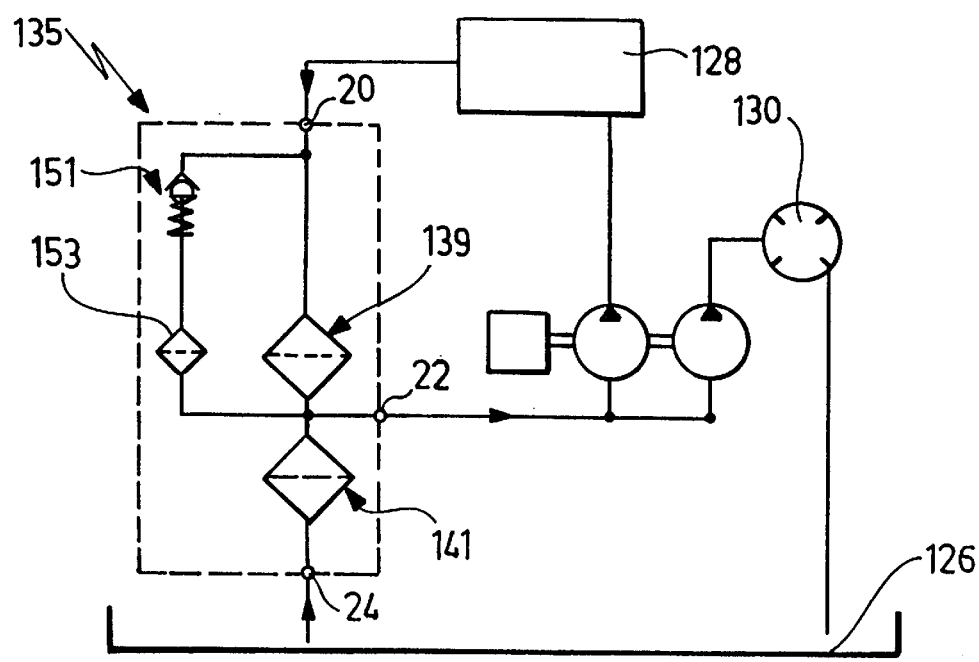

An example of a hydraulic circuit in which the filter device 135 can be used is represented in FIG. 6. This substantially corresponds to the hydraulic circuit sketched in FIG. 4, although, by contrast with the latter, in the event of an impermissible pressure increase on the flow-accepting side of the first subelement 139, a direct flow connection to the common outlet 22 is provided by the bypass valve 151, the screening element 153 additionally being used, ensuring coarse filtering of the hydraulic fluid originating from the hydraulic consumer 128.

What is claimed is:

1. A filter device for filtering a hydraulic fluid, with a filter housing in which a filter element is disposed, characterized in that the filter element comprises a first and a second subelement, the first subelement having a higher filter fineness than the second subelement and both subelements being insertable through a common insertion opening into the filter housing, and in that it is possible for hydraulic fluid to be fed to each subelement via a separate supply inflow the filter housing and for filtered hydraulic fluid to be discharged from both subelements via a common outflow in the filter housing.

2. The filter device as claimed in claim 1, characterized in that the supply inflows are separated fluid-tightly from each other by means of at least one sealing element.

3. The filter device as claimed in claim 1, characterized in that the first subelement has an associated bypass passageway with a bypass valve.

4. The filter device as claimed in claim 3, characterized in that the bypass passageway connects the supply inflow of the first subelement to the supply inflow of the second subelement.

5. The filter device as claimed in claim 3, characterized in that the bypass passageway connects the supply inflow of the first subelement to the common outflow of the first and second subelements.

6. The filter device as claimed in claim 5, characterized in that a screening element is disposed in the bypass passageway.

7. The filter device as claimed in claim 1, characterized in that the filter housing comprises a detachably connectable cover for closing the insertion opening.

8. The filter device as claimed in claim 7, characterized in that the filter housing comprises a filter casing for receiving the filter element, with a bottom wall, in which an access opening is disposed, it being possible for the filter casing to be closed fluid-tightly by means of the cover.

9. A filter element for a hydraulic fluid filter device, said filter element comprising:

a first subelement and a second subelement, the first subelement having a higher filter fineness than the second subelement;

wherein:

the first and second subelements are insertable through a common insertion opening into a filter housing of the filter device;

separate respective supply inflows in the filter housing for each subelement allow hydraulic fluid to be fed to each subelement; and a common outflow in the filter housing enables the discharge of filtered hydraulic fluid from each subelement.

10. The filter element as claimed in claim 9, characterized in that the first subelement has a filter fineness of less than approximately 20μm.

11. The filter element as claimed in claim 9, characterized in that the first subelement has a filter material with a nonwoven fabric.

12. The filter element as claimed in claim 9, characterized in that the second subelement has a filter fineness of less than approximately 60 μm.

13. The filter element as claimed in claim 9, characterized in that the second subelement is formed as a screening element.

14. The filter element as claimed in claim 9, characterized in that the two subelements can be detachably connected to each other.

15. The filter element as claimed in claim 9, characterized in that the two subelements can be undetachably connected to each other.

16. The filter element as claimed in claim 9, characterized in that the filter element is formed in a substantially cylindrical manner and the two subelements are disposed axially one behind the other.

17. The filter element as claimed in claim 16, characterized in that the filter element comprises at least one sealing ring for the fluid-tight separation of the supply inflows for the two subelements.

18. The filter element as claimed in claim 9, characterized in that the filter element comprises a bypass valve for bypassing the first subelement.

19. The filter element as claimed in claim 9, characterized in that the second subelement can be flowed through both from the inside outward and from the outside inward.

20. A hydraulic circuit with a supply of hydraulic fluid which is made available to at least one hydraulic consumer by means of at least one pump, and can be fed back from the consumer to the hydraulic supply via at least one return line, and also with a filter device as claimed in claim 1, one supply inflow being connected to the hydraulic supply, the other supply inflow being connected via a return line to at least one consumer and the outflow being connected to the pump.

21. The hydraulic circuit as claimed in claim 19, characterized in that only a partial flow of the hydraulic fluid delivered by the at least one pump is passed to the supply inflow of the filter device, while the remaining partial flow is fed into the hydraulic supply.

22. The hydraulic circuit as claimed in claim 19, characterized in that all the hydraulic fluid delivered by the at least one pump is fed to the supply inflow of the filter device associated with the first subelement.

* * * * *

UNITED STATES PATENT AND TRADEMARK OFFICE
CERTIFICATE OF CORRECTION

PATENT NO. : 6,605,210 B2
DATED : August 12, 2003
INVENTOR(S) : Reinhardt

It is certified that error appears in the above-identified patent and that said Letters Patent is hereby corrected as shown below:

<u>Title page,</u>
Item [30], Foreign Application Priority Data, the application number is corrected to read: -- 199 55 635 --.

<u>Column 9,</u>
Line 58, after the word "inflow" add the word -- in --.

<u>Column 12,</u>
Lines 1 and 6, change "19" to -- 20 --.

Signed and Sealed this

Second Day of December, 2003

JAMES E. ROGAN
*Director of the United States Patent and Trademark Office*